(12) United States Patent
Palenius et al.

(10) Patent No.: US 6,732,302 B1
(45) Date of Patent: May 4, 2004

(54) BLIND RATE DETECTION IN A MULTIPLEXED TRANSMISSION SYSTEM

(75) Inventors: Torgny Palenius, Löddeköpinge (SE); Michael Breschel, Lund (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 536 days.

(21) Appl. No.: 09/658,459

(22) Filed: Sep. 8, 2000

Related U.S. Application Data (60) Provisional application No. 60/156,697, filed on Sep. 30, 1999.

(51) Int. Cl.[7] .............................................. G06F 11/00
(52) U.S. Cl. .............................. 714/48; 714/4; 714/25; 714/701; 714/758
(58) Field of Search ................... 714/4, 48, 25, 714/37, 701, 758; 370/458

(56) References Cited

U.S. PATENT DOCUMENTS

| | | | |
|---|---|---|---|
| 5,267,244 A | | 11/1993 | Messerschmitt et al. |
| 5,642,354 A | * | 6/1997 | Spear .......................... 370/329 |
| 5,805,633 A | | 9/1998 | Uddenfeldt |
| 5,818,826 A | | 10/1998 | Gfeller et al. |
| 5,822,359 A | | 10/1998 | Bruckert et al. |
| 5,878,036 A | | 3/1999 | Spartz et al. |
| 5,909,435 A | | 6/1999 | Apelewicz |
| 5,914,943 A | | 6/1999 | Higuchi et al. |
| 5,923,679 A | * | 7/1999 | Itoh et al. .................... 714/752 |
| 5,928,379 A | | 7/1999 | Hattori |
| 5,930,706 A | * | 7/1999 | Raith .......................... 455/422 |
| 5,953,324 A | | 9/1999 | Adachi |
| 5,966,373 A | | 10/1999 | Stephenson et al. |
| 6,046,990 A | * | 4/2000 | Chennakeshu et al. ..... 370/317 |
| 6,314,081 B1 | * | 11/2001 | Chennakeshu et al. ..... 370/203 |
| 6,330,700 B1 | * | 12/2001 | Morris et al. ................ 714/752 |
| 6,414,945 B1 | * | 7/2002 | Chennakeshu et al. ..... 370/317 |
| 6,438,119 B1 | * | 8/2002 | Kim et al. ................... 370/335 |
| 6,490,260 B1 | * | 12/2002 | Hwang ........................ 370/335 |
| 6,507,572 B1 | * | 1/2003 | Kumar et al. ................ 370/335 |

FOREIGN PATENT DOCUMENTS

| | | |
|---|---|---|
| WO | WO99/41853 | 8/1999 |
| WO | WO99/48227 | 9/1999 |

* cited by examiner

*Primary Examiner*—Nadeem Iqbal
*Assistant Examiner*—Timothy M. Bonura
(74) *Attorney, Agent, or Firm*—Burns, Doane, Swecker & Mathis, L.L.P.

(57) ABSTRACT

Data is multiplexed in a frame having a fixed bit length in a telecommunication system. The data is transmitted by transmitting a first transport channel comprising a first number of bits; transmitting first error detection bits associated with the first transport channel and comprising a second number of bits; transmitting a second transport channel comprising a third number of bits; transmitting a third transport channel comprising a fourth number of bits; and selectively transmitting a control channel comprising a fifth number of bits. The control channel is transmitted after the first error detection bits and before transmission of the third transport channel. Whenever the control channel is transmitted as part of the frame, a sum of the first, second, third, fourth and fifth number of bits equals the fixed bit length, but whenever the control channel is not transmitted as part of the frame, a sum of the first, second, third and fourth number of bits equals the fixed bit length.

36 Claims, 5 Drawing Sheets

BLIND RATE DETECTION IN A MULTIPLEXED TRANSMISSION SYSTEM

CROSS-REFERENCE TO RELATED APPLICATIONS

This application claims the benefit of U.S. Provisional Application No. 60/156,697, filed Sep. 30, 1999, which is hereby incorporated herein by reference in its entirety.

BACKGROUND

The present invention relates generally to radio communication and, more particularly, to the format of transport channels and control channels within a frame of a radio communication system.

Figure 1:
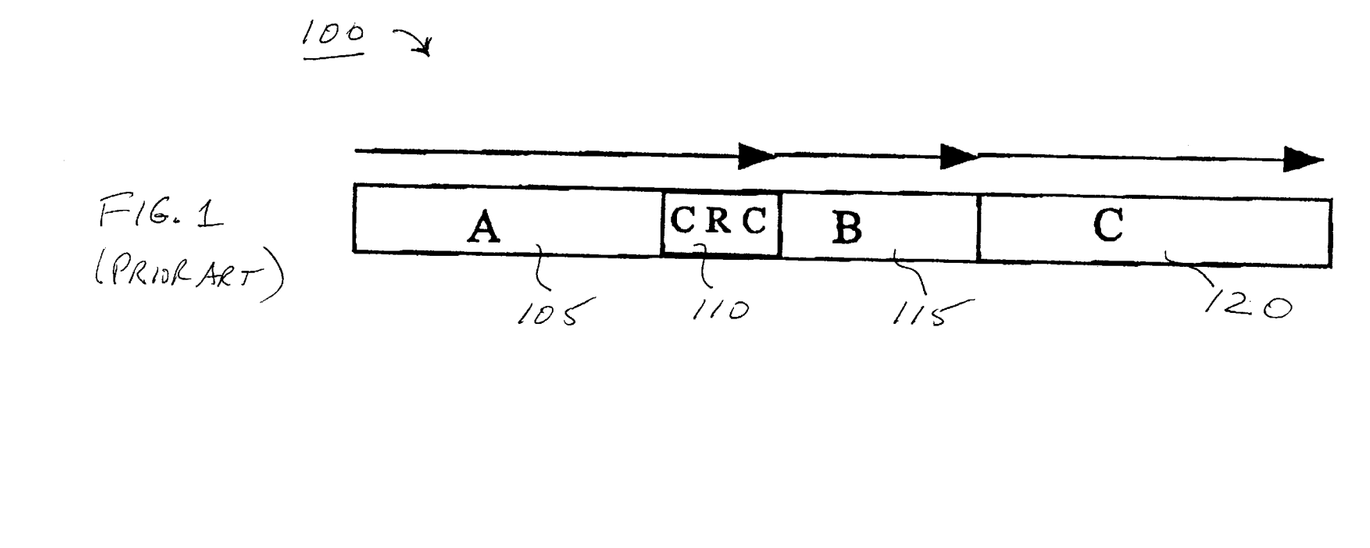
FIG. 1 is a block diagram of a conventional frame format.

Radio communication systems conventionally multiplex data channels and control channels within a transmission frame. For example, Third Generation Partnership Project ("3GPP") standardization for Wideband Code Division Multiple Access (W-CDMA) multiplexes three different data channels (e.g., transport channels) within a transmission frame of a fixed length. FIG. 1 illustrates a conventional frame format in accordance with the 3GPP standards. As shown, a frame 100 includes a first field A 105 for holding data associated with a first transport channel. The frame 100 additionally includes second fields B 115 and C 120 for conveying information associated with second and third transport channels, respectively. Because the A field 105 typically carries important information (e.g., in the case of voice coding, information that is most important for recreating intelligible speech), Cyclic Redundancy Check (CRC) bits 110 are additionally attached to the first field A 105 for providing error detection capability in connection with the first transport channel. The information carried by the B and C fields 115, 120 is typically of lesser importance, so these fields are not associated with CRC bits.

Each of the fields within the frame 100 shown in FIG. 1 may be designed to have a single, fixed beginning and ending location within the frame 100, thereby making each field easy to locate and decode. In this case, the length of each field must be large enough to accommodate the highest expected bit rate associated with the corresponding transport channel. Fixed field positions, however, use the system capacity in an inefficient way whenever a transport channel provides insufficient data to fill its associated field within the frame 100.

The use of variable field lengths (e.g., increasing or diminishing the length of the A, B, and/or C fields to accommodate more or less available data traffic) can alleviate the inefficiencies that can result from fixed field positions. For example, the length of the A field 105 is often permitted to be any one of a number of predefined lengths, thereby permitting information to be transmitted at a variable rate. To determine the actual length of a received A field 105, a process called "blind rate detection" is used, in which the actual data rate is determined without the need for rate information to be expressly inserted into the frame. In one blind rate detection strategy, the receiver hypothesizes one of these predefined lengths, such as the shortest one. Using the hypothesized length, the A field 105 is decoded, and its CRC field 110 (which must, by definition, immediately follow the A field 105) determined. If the CRC field 110 indicates that no errors were detected, then the hypothesized length is presumed to have been correct. Otherwise, another one of the predefined lengths is hypothesized (e.g., the next largest length) and the process is repeated until a CRC field 110 indicates an absence of errors. At this point, the A field 105 is presumed to have been decoded correctly, and its length is known to be the last hypothesized length.

As mentioned earlier, fields B 115 and C 120 typically do not have attached CRC bits. Since, as defined in accordance with the 3GPP standards, the frame 100 is of a known length, the length of the B 115 and C 120 fields must be set to accommodate the length of the A field 105. Typically, for each of the predefined lengths of the A field 105, lengths for each of the B and C fields 115, 120 are predefined as well. Thus the lengths, as well as the starting positions, of the B and C fields 115, 120 are known once the length of the A field 105 is known.

In addition to the A 105, CRC 110, B 115 and C 120 fields described above, a variable length control channel DCCH is sometimes transmitted in the frame 100. Because it is transmitted only occasionally, it would be inefficient to define a frame format that always included the DCCH field. Consequently, the frame format is defined in a way that permits the DCCH field to "steal" bits from the C field 120. The DCCH field is also permitted to vary in length, however. This creates the problem of not knowing how many bits have been "stolen" from the C-field.

Figure 2:
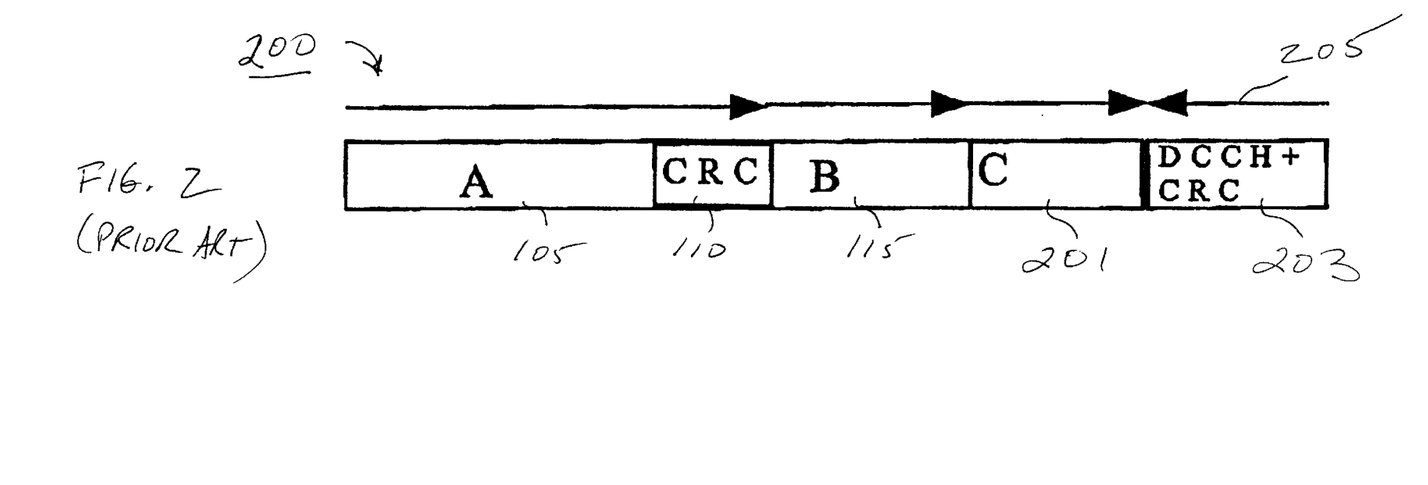
FIG. 2 is a block diagram of a conventional frame format in which the DCCH field is located at the end of the frame 200.

As shown in FIG. 2, it has been proposed to locate the DCCH field 203 (which includes an associated CRC field) at the end of the frame 200, with bits that make up the DCCH field 203 being "stolen" from the C field 201. The lengths of the A and B fields 105, 115 are determined in the same manner as described above. To determine the length of the C field 201, it is necessary to know the length of the DCCH field 203. In the proposal, this is done by hypothesizing a first one of the possible DCCH lengths (e.g., a shortest DCCH length), and decoding the DCCH field 203 from the end of the frame 200. This is illustrated in FIG. 2 by means of the backwards arrow 205. If the DCCH's CRC field fails to detect any errors in the decoded result, then the hypothesized length of the DCCH field 203 is presumed to have been correct. Otherwise, another DCCH length is hypothesized, and the process is repeated until either the DCCH field 203 is correctly decoded, or until a failure to decode any DCCH field indicates that the DCCH field 203 is not present in the frame 200 (i.e., no bits were stolen from the C field 201). Once the length of the DCCH field 203 is known, the length of the C field can also be determined.

The proposed solution presents a number of problems. To begin with, it is very difficult to implement a format in which the bits are transmitted and received backwards. Furthermore, the proposed format is very different from other formats. This would require that a completely new kind of multiplexing be standardized.

SUMMARY

It is therefore an object of the present invention to provide a multiplexing technique that permits a variable length DCCH field to be intermittently included in a frame having a fixed length.

In accordance with one aspect of the present invention, data is multiplexed in a frame having a fixed bit length in a telecommunication system. This is achieved by transmitting a first transport channel comprising a first number of bits; transmitting first error detection bits associated with the first transport channel and comprising a second number of bits; transmitting a second transport channel comprising a third number of bits; transmitting a third transport channel comprising a fourth number of bits; and selectively transmitting a control channel comprising a fifth number of bits. Furthermore, the control channel is transmitted after the first error detection bits and before transmission of the third transport channel; whenever the control channel is transmitted as part of the frame, a sum of the first, second, third, fourth and fifth number of bits equals the fixed bit length; and whenever the control channel is not transmitted as part of the frame, a sum of the first, second, third and fourth number of bits equals the fixed bit length.

In other aspects of the invention, the control channel may be transmitted between the first error detection bits and the second transport channel. Alternatively, the control channel may be transmitted between the second and third transport channels.

In another aspect of the invention, the fifth number of bits may further include error detection bits associated with the control channel.

In still another aspect of the invention, multiplexed data that is received as a frame in a telecommunication system is decoded, wherein the frame has a fixed bit length. This is achieved by decoding a first transport channel contained in the frame, wherein the decoding step includes determining a first length of the first transport channel; decoding a second group of bits having a second length that is a function of the first length; determining whether the second group of bits includes error detection bits associated with the second group of bits. Then, if the frame includes error detection bits associated with the second group of bits, then a third length and starting position of a second transport channel in the frame are determined, and the second transport channel is decoded, wherein the third length is a function of the first length and the second length. However, if the frame does not include error detection bits associated with the second group of bits, then the decoded second group of bits is used as the decoded second transport channel. Furthermore, the steps of decoding the first transport channel and decoding the second group of bits are performed in a same direction.

In another aspect of the invention, after decoding the first transport channel and prior to decoding the second group of bits, a third transport channel is decoded, wherein the third transport channel has a fourth length that is a function of only the first length.

Alternatively, the third transport channel may be decoded after decoding both the first transport channel and the second group of bits. In such embodiments, the third transport channel may have a fourth length that is a function of only the first length. Alternatively, the third transport channel may have a fourth length that is a function of both the first length and the second length.

In still other embodiments of the invention, data can be multiplexed in a frame having a fixed bit length in a telecommunication system by transmitting a first group of one or more transport channels, wherein the one or more transport channels in the first group together comprise a first number of bits; transmitting first error detection bits associated with one or more transport channels in the first group of one or more transport channels, wherein the first error detection bits comprise a second number of bits; transmitting a second group of one or more transport channels, wherein the one or more transport channels in the second group together comprise a third number of bits; transmitting a third group of one or more transport channels, wherein the one or more transport channels in the third group together comprise a fourth number of bits; and selectively transmitting a control channel comprising a fifth number of bits, wherein: the control channel is transmitted after the first group of one or more transport channels and the first error detection bits but before transmission of the third group of one or more transport channels; whenever the control channel is transmitted as part of the frame, a sum of the first, second, third, fourth and fifth number of bits equals the fixed bit length; and whenever the control channel is not transmitted as part of the frame, a sum of the first, second, third and fourth number of bits equals the fixed bit length.

In yet other alternative embodiments, multiplexed data that is received as a frame in a telecommunication system is decoded, wherein the frame has a fixed bit length. This is performed by decoding a first group of one or more transport channels contained in the frame, wherein the decoding step includes determining a first length of the first group of one or more transport channels; decoding a second group of bits having a second length that is a function of the first length; and determining whether the second group of bits includes error detection bits associated with the second group of bits. If the frame includes error detection bits associated with the second group of bits, then a third length and starting position of a second group of one or more transport channels in the frame is determined and the second group of one or more transport channels is decoded, wherein the third length is a function of the first length and the second length. If the frame does not include error detection bits associated with the second group of bits, then the decoded second group of bits is used as the decoded second group of one or more transport channels, wherein the steps of decoding the first group of one or more transport channels and decoding the second group of bits are performed in a same direction.

BRIEF DESCRIPTION OF THE DRAWINGS

The objects and advantages of the invention will be understood by reading the following detailed description in conjunction with the drawings in which.

DETAILED DESCRIPTION

The various features of the invention are described with respect to the figures, in which like parts are identified with the same reference characters. A number of exemplary embodiments are disclosed. To facilitate an understanding of the invention, many aspects of the invention are described in terms of sequences of actions (e.g., the generation of bits and/or bit fields in various orders) to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action.

Figure 3:
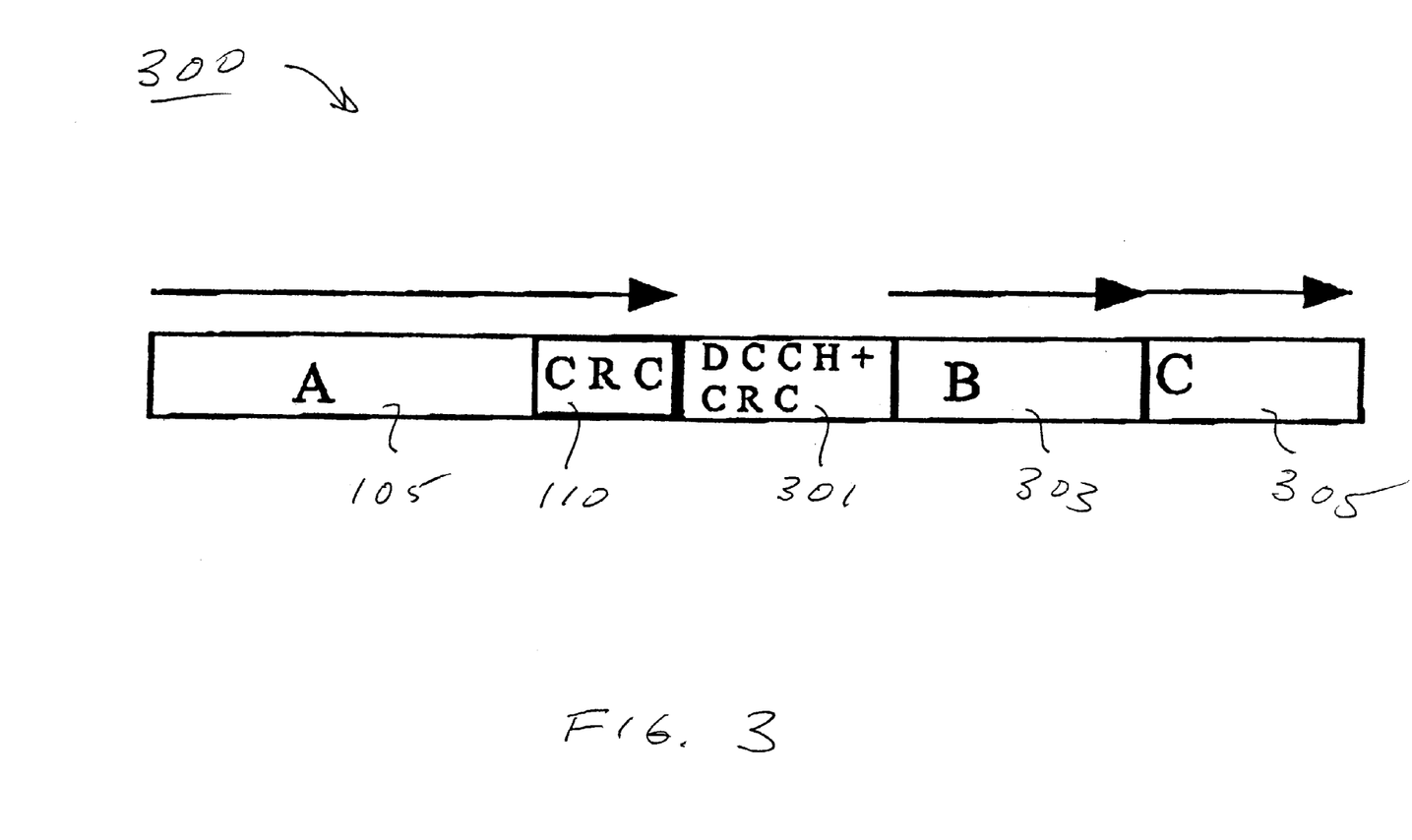
FIG. 3 is a block diagram of a multiplexing format in accordance with one embodiment of the invention.

Referring to FIG. 3, a block diagram of a multiplexing format in accordance with a first embodiment of the invention is shown. Here, a frame 300 has A and CRC fields 105, 110 as in the prior art. The A field 105 may be a variable length field, whose length is determined as described above, that is, by hypothesizing one or more possible lengths and determining which of these hypotheses results in the CRC field 110 indicating that there are no errors. The frame 300 also includes a B field 303 and a C field 305. It is also possible (but not necessary) to include a variable length DCCH+CRC field 301 in the frame 300. When no DCCH+CRC field 301 is present, the B and C fields 303, 305 directly follow the CRC field 110, in that order. In this case, the lengths of the B and C fields 303, 305 are determined from the length of the A field 105. Once the length of the A field 105 is known, the respective lengths of the B and C fields 303, 305 are known as well.

In accordance with one aspect of the invention, when the DCCH+CRC field 301 is included in the frame 300, it is located just after the CRC field 110 and before the B field 303. The frame 300 may be decoded by performing the steps (e.g., by means of a programmed processor) illustrated in FIG. 4. First, a length for the A field 105 is hypothesized (step 401). Using this hypothesized length, an attempt is made to decode the A field 105, knowing that it will be located at the beginning of the frame 300 (step 403). A test is then performed to determine whether the CRC field 110 indicates that errors were encountered during the decoding process (step 405). If errors were encountered, then a new length for the A field 105 is hypothesized (step 407), and the decoding step is repeated (step 403).

Figure 4:
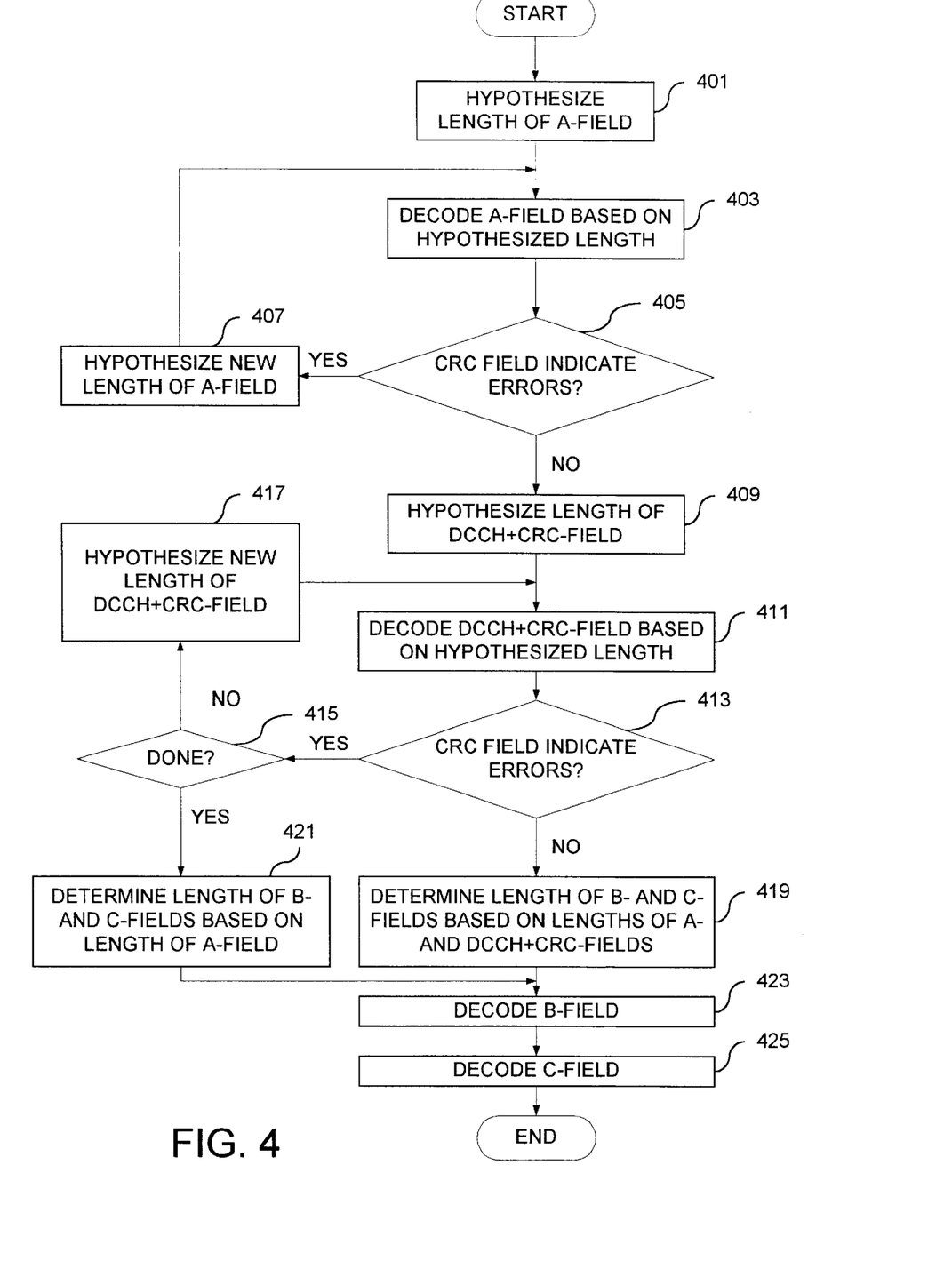
FIG. 4 is a flow chart depicting steps for decoding a frame in accordance with the invention.

Eventually, the correct length will be hypothesized for the A field 105, so the test at decision block 405 will find that no errors were encountered. When this happens, the A field 105 has been decoded and its length is now known. Next, it must be determined whether there is a DCCH+CRC field 301 present, and if so, what its length is. This is done by hypothesizing a first (e.g., shortest non-zero) length of the DCCH+CRC field 301 (step 409). Using this hypothesized length, the bits just after the CRC field 110 are decoded (step 411). A test is then performed to determine whether the DCCH's CRC field indicates that errors were encountered during the decoding process (step 413). If errors were encountered, then a test is made to determine whether there are any remaining possible lengths of the DCCH+CRC field 301 (step 415). If so, then a next one of these possible lengths becomes the new hypothesis (step 417), and the decoding step is repeated (step 411).

If the DCCH+CRC field 301 is present, its actual length will eventually be hypothesized, with the result that no errors will be encountered during the decoding process ("NO" path out of decision block 413). In this case, the actual lengths of the A and DCCH+CRC fields 105, 301 will be known, so the lengths as well as the starting locations of the B and C fields 303, 305 can also be determined (step 419). It is noted that in performing this step, it is necessary to know from which of the B and C fields 303, 305 the DCCH+CRC field 301 (if present) stole bits. This can be standardized in any of a number of alternative ways. For example, it can be required that all of the DCCH+CRC field bits are stolen from the B field 303, so that the length of the B field 303 is given by its nominal length (as specified by the length of the A field 105) minus the number of stolen bits. Alternatively, all of the bits occupied by the DCCH+CRC field 301 may be stolen from the C field 305. In other alternatives, some bits for the DCCH+CRC field 301 can be stolen from the B field 303, while the remaining bits are stolen from the C field 305.

Referring back to decision block 415, if the DCCH+CRC field 301 is not present, all of its possible non-zero lengths will eventually have been hypothesized and tested unsuccessfully ("YES" path out of decision block 415). In this case, the actual length of the A field 105 is known, and the length of DCCH+CRC field 301 is not a factor since it is not present. Consequently, the lengths as well as the starting locations of the B and C fields 303, 305 can be determined from the length of the A field 105 (step 421).

Once the lengths and starting positions of the B and C fields are known, each can then be decoded using known techniques (steps 423 and 425).

Figure 5:
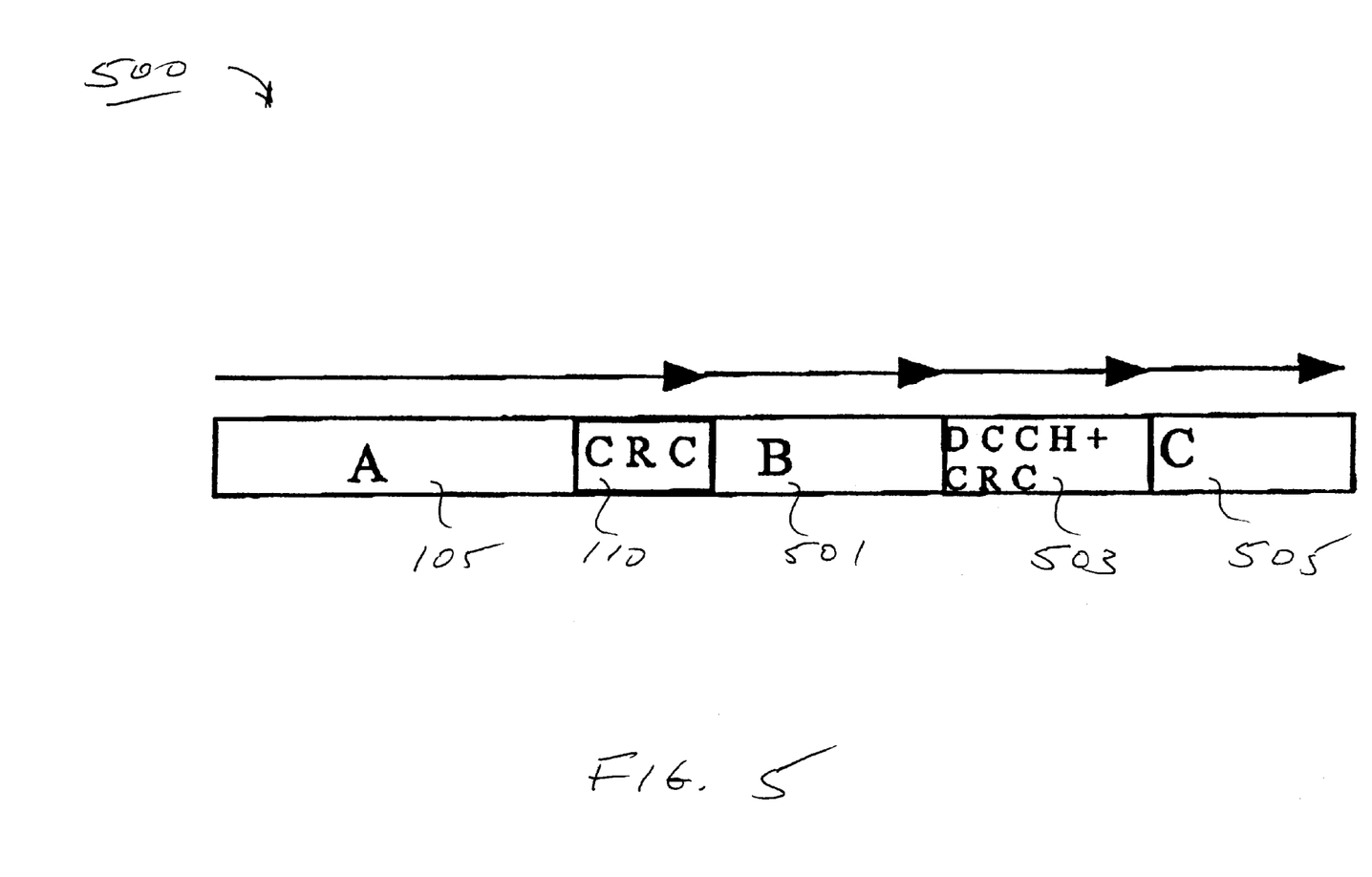
FIG. 5 is a block diagram of a multiplexing format in accordance with an alternative embodiment of the invention.

In accordance with an alternative embodiment of the invention, a frame 500 has a multiplexing format as illustrated in FIG. 5. Here, a frame 500 has A and CRC fields 105, 110 as in the prior art. The A field 105 may be a variable length field, whose length is determined as described above, that is, by hypothesizing one or more possible lengths and determining which of these hypotheses results in the CRC field 110 indicating that there are no errors. The frame 500 also includes a B field 501 and a C field 505. It is also possible (but not necessary) to include a variable length DCCH+CRC field 503 in the frame 300. When no DCCH+CRC field 503 is present, the B and C fields 501, 505 directly follow the CRC field 110, in that order. In this case, the lengths of the B and C fields 501, 505 are determined from the length of the A field 105. Once the length of the A field 105 is known, the respective lengths of the B and C fields 501, 505 are known as well.

In accordance with one aspect of the invention, when the DCCH+CRC field 503 is included in the frame 500, it is located just after the B field 501 and before the C field 505. The frame 500 may be decoded by performing the steps (e.g., by means of a programmed processor) illustrated in FIG. 6. First, a length for the A field 105 is hypothesized (step 601). Using this hypothesized length, an attempt is made to decode the A field 105, knowing that it will be located at the beginning of the frame 500 (step 603). A test is then performed to determine whether the CRC field 110 indicates that errors were encountered during the decoding process (step 605). If errors were encountered, then a new length for the A field 105 is hypothesized (step 607), and the decoding step is repeated (step 603).

Figure 6:
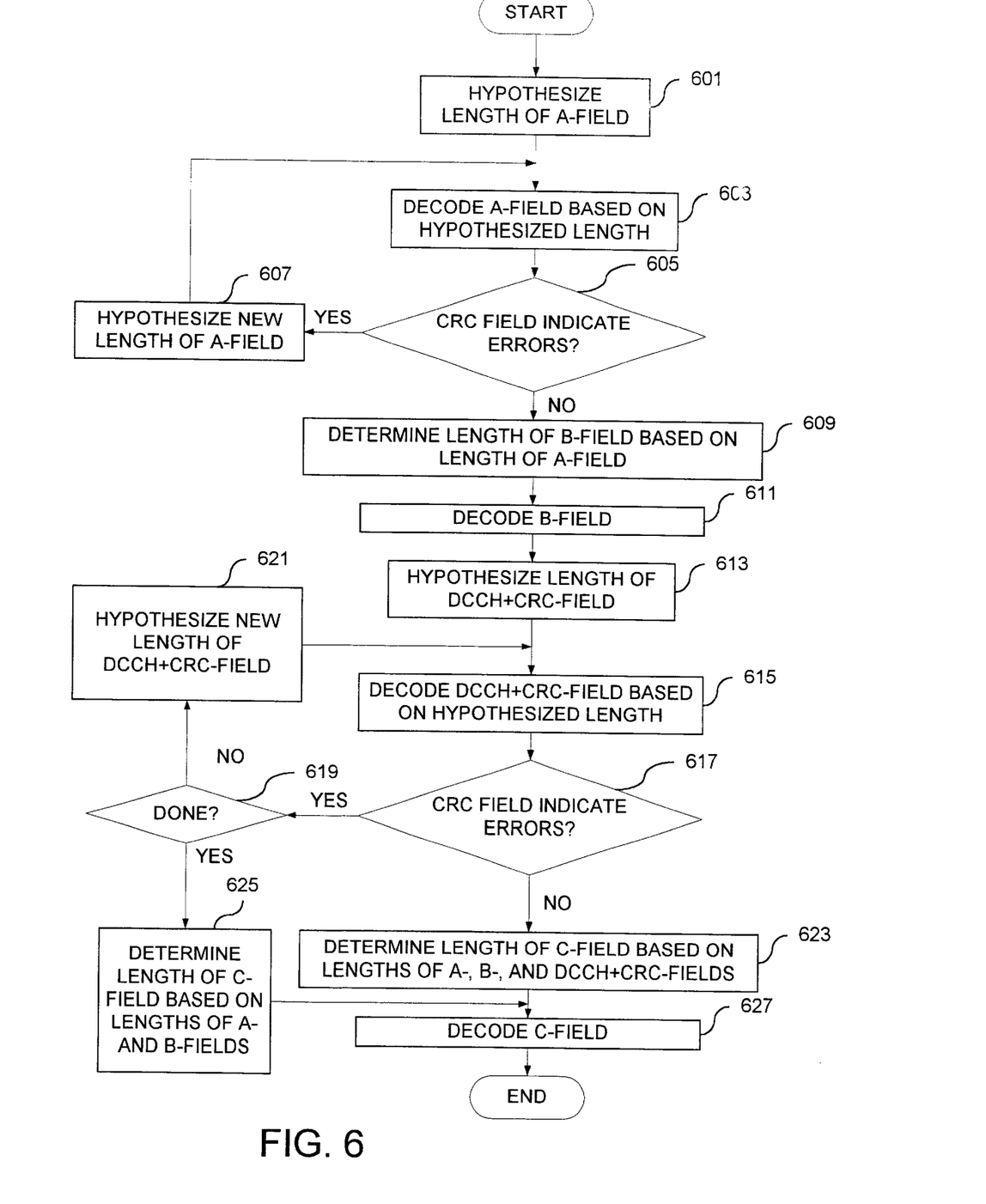
FIG. 6 is a flow chart depicting steps for decoding a frame in accordance with an alternative embodiment of the invention.

Eventually, the correct length will be hypothesized for the A field 105, so the test at decision block 605 will find that no errors were encountered. When this happens, the A field 105 has been decoded and its length is now known. Given the length of the A field 105, the length of the B field 501 is known as well (i.e., for each possible length of A field 105, a corresponding length of B field 501 is predefined as well) (step 609). It is further known that the B field 501 follows directly after the A field 105, so the B field 501 is now decoded (step 611).

Next, it must be determined whether there is a DCCH+CRC field 503 present, and if so, what its length is. This is done by hypothesizing a first (e.g., shortest non-zero) length of the DCCH+CRC field 503 (step 613). Using this hypothesized length, the bits just after the B field 501 are decoded (step 615). A test is then performed to determine whether the DCCH's CRC field indicates that errors were encountered during the decoding process (step 617). If errors were encountered, then a test is made to determine whether there are any remaining possible lengths of the DCCH+CRC field 301 (step 619). If so, then a next one of these possible lengths becomes the new hypothesis (step 621), and the decoding step is repeated (step 615).

If the DCCH+CRC field 503 is present, its actual length will eventually be hypothesized, with the result that no errors will be encountered during the decoding process ("NO" path out of decision block 617). In this case, the actual lengths of the A, B, and DCCH+CRC fields 105, 501, 503 will be known, so the length as well as the starting location of the C field 505 can also be determined (step 623). It is noted that in performing this step, the decoding order requires that the DCCH+CRC field 301 steal its bits from the C field 505.

Referring back to decision block 619, if the DCCH+CRC field 503 is not present, all of its possible non-zero lengths will eventually have been hypothesized and tested unsuccessfully ("YES" path out of decision block 619). In this case, the actual lengths of the A, and B fields 105, 501 will be known, and the length of the DCCH+CRC field 503 is not a factor since it is not present, so the length as well as the starting location of the C field 505 can also be determined based on the lengths of the A and B fields 105, 501 (step 625).

Once the length and starting position of the C field 505 is known, it can then be decoded using known techniques (step 627).

A few further comments can be made that are applicable to each of the above-described embodiments. First, when rate matching is applied, the rate matching positions should all be equal, independent of the rate and multiplexing that is used. More particularly, rate matching is used after encoding to puncture away some bits, or alternatively to repeat some bits (i.e., for use as padding), as required to enable the field length of data to fit into the actual channel. When the transport channel can assume different lengths, however, the rate matching similarly has to increase or decrease the length of the data to be transmitted to match the size of the actual channel. In accordance with the above-described blind rate detection techniques, the same bits should be repeated when padding, and the same bits should be punctured independent of the transport format. For example, if bit number 3 is to be repeated when padding, or deleted when puncturing, this should be the case for each of the possible lengths of the transport channel. This will ensure that the hypothesized decoding described above can take place.

Furthermore, if no DCCH+CRC field 301, 503 is transmitted and the DCCH+CRC field 301, 503 and B field 303 or C field 505 are coded with the same code and the same rate matching, then the decoding of DCCH can end when no expected CRC is found, meaning that the next field of known length (either the B field 303 if the format of FIG. 3 is used, or the C field 505 if the format of FIG. 5 is used) is decoded instead. In this manner, the processing can be made more efficient since no further steps are necessary for decoding alternatively the B field 303 or the C field 505.

The invention presents a number of advantages over conventional solutions. For example, it is possible to achieve blind rate detection on flexible position formats without requiring several decoding loops for detecting the rate. Furthermore, normal bit order is used, so that no special solutions in the rate matching scheme are required. Additionally, it is possible to steal an arbitrary number of bits up to the length of the C field, B field or the combination of the C and B fields.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the invention has been described in connection with embodiments involving only three transport channels, denoted the A, B, and C fields. It will be recognized that the inventive techniques described herein can be applied in other embodiments in which the defined frame has more than three fields. More generally, the frame can be considered to comprise a first group of one or more transport channels (corresponding to the one transport channel denoted as the A field 105 in the above-described embodiments); a second group of one or more transport channels (corresponding to the one transport channel denoted as the B field 303, 501; and a third group of one or more transport channels (corresponding to the one transport channel denoted as the C field 305, 505). The transport channels within the first group of transport channels need not all be the same length as one another; the transport channels within the second group of transport channels need not all be the same length as one another; and the transport channels within the third group of transport channels need not all be the same length as one another. Interspersed between the transport channels that make up the first group of one or more transport channels can be one or more groups of error detection bits (e.g., CRC bits). It is not required that each of the transport channels within the first group of transport channels have its own group of error detection bits.

In accordance with this more generalized form of the invention, the DCCH+CRC field, when present, can be located at any position following both the first group of one or more transport channels and any groups of associated error detection bits, but preceding the third group of one or more transport channels. Performing blind rate detection under these circumstances follows the form outlined above with respect to the earlier-described embodiments: First, the length of the first group of one or more transport channels is determined. This may involve hypothesizing different lengths for one or more of the one or more transport channels that make up the first group, and then testing to determine which hypotheses are correct, based on, for example, the one or more groups of error detection bits. Having determined the length of the first group of one or more transport channels, the length of the second group of one or more transport channels may also now be known if the control channel (DCCH+CRC), whenever it is present, is not to immediately precede the second group of one or more transport channels. Beginning at whatever location the control channel (DCCH+CRC) is expected to appear whenever it is present (either before or after the second group of one or more transport channels), its possible lengths are hypothesized and tested as described above using its associated CRC field. Once the length of the DCCH+CRC field is known (including the possibility of its length being zero, meaning that it is not present), the starting location of the remaining group(s) of transport channels as well as their length, is now known, and these transport channels can be decoded, as described above. (The length of the remaining group(s) of transport channels is known since it must be equal to the total length of the frame minus the length of the decoded fields up to an including the DCCH+CRC field.)

What is claimed is:

1. A method of multiplexing data in a frame having a fixed bit length in a telecommunication system, the method comprising:

transmitting a first transport channel comprising a first number of bits;

transmitting first error detection bits associated with the first transport channel and comprising a second number of bits;

transmitting a second transport channel comprising a third number of bits;

transmitting a third transport channel comprising a fourth number of bits; and selectively transmitting a control channel comprising a fifth number of bits, wherein:

the control channel is transmitted after the first error detection bits and before transmission of the third transport channel;

whenever the control channel is transmitted as part of the frame, a sum of the first, second, third, fourth and fifth number of bits equals the fixed bit length; and whenever the control channel is not transmitted as part of the frame, a sum of the first, second, third and fourth number of bits equals the fixed bit length.

2. The method of claim 1, wherein the control channel is transmitted between the first error detection bits and the second transport channel.

3. The method of claim 1, wherein the control channel is transmitted between the second and third transport channels.

4. The method of claim 1, wherein the fifth number of bits further includes error detection bits associated with the control channel.

5. A method of decoding multiplexed data that is received as a frame in a telecommunication system, wherein the frame has a fixed bit length, the method comprising:

decoding a first transport channel contained in the frame, wherein the decoding step includes determining a first length of the first transport channel;

decoding a second group of bits having a second length that is a function of the first length;

determining whether the second group of bits includes error detection bits associated with the second group of bits;

if the frame includes error detection bits associated with the second group of bits, then determining a third length and starting position of a second transport channel in the frame and decoding the second transport channel, wherein the third length is a function of the first length and the second length; and if the frame does not include error detection bits associated with the second group of bits, then using the decoded second group of bits as the decoded second transport channel, wherein the steps of decoding the first transport channel and decoding the second group of bits are performed in a same direction.

6. The method of claim 5, further comprising:

after decoding the first transport channel and prior to decoding the second group of bits, decoding a third transport channel having a fourth length that is a function of only the first length.

7. The method of claim 5, further comprising:

after decoding both the first transport channel and the second group of bits, decoding a third transport channel.

8. The method of claim 7, wherein the third transport channel has a fourth length that is a function of only the first length.

9. The method of claim 7, wherein the third transport channel has a fourth length that is a function of both the first length and the second length.

10. A method of multiplexing data in a frame having a fixed bit length in a telecommunication system, the method comprising:

transmitting a first group of one or more transport channels, wherein the one or more transport channels in the first group together comprise a first number of bits;

transmitting first error detection bits associated with one or more transport channels in the first group of one or more transport channels, wherein the first error detection bits comprise a second number of bits;

transmitting a second group of one or more transport channels, wherein the one or more transport channels in the second group together comprise a third number of bits;

transmitting a third group of one or more transport channels, wherein the one or more transport channels in the third group together comprise a fourth number of bits; and selectively transmitting a control channel comprising a fifth number of bits, wherein:

the control channel is transmitted after the first group of one or more transport channels and the first error detection bits but before transmission of the third group of one or more transport channels;

whenever the control channel is transmitted as part of the frame, a sum of the first, second, third, fourth and fifth number of bits equals the fixed bit length; and whenever the control channel is not transmitted as part of the frame, a sum of the first, second, third and fourth number of bits equals the fixed bit length.

11. The method of claim 10, wherein the control channel is transmitted between the first error detection bits and the second group of one or more transport channels.

12. The method of claim 10, wherein the control channel is transmitted between the second group of one or more transport channels and the third group of one or more transport channels.

13. The method of claim 10, wherein the fifth number of bits further includes error detection bits associated with the control channel.

14. A method of decoding multiplexed data that is received as a frame in a telecommunication system, wherein the frame has a fixed bit length, the method comprising:

decoding a first group of one or more transport channels contained in the frame, wherein the decoding step includes determining a first length of the first group of one or more transport channels;

decoding a second group of bits having a second length that is a function of the first length;

determining whether the second group of bits includes error detection bits associated with the second group of bits;

if the frame includes error detection bits associated with the second group of bits, then determining a third length and starting position of a second group of one or more transport channels in the frame and decoding the second group of one or more transport channels, wherein the third length is a function of the first length and the second length; and if the frame does not include error detection bits associated with the second group of bits, then using the decoded second group of bits as the decoded second group of one or more transport channels, wherein the steps of decoding the first group of one or more transport channels and decoding the second group of bits are performed in a same direction.

15. The method of claim 14, further comprising:

after decoding the first group of one or more transport channels and prior to decoding the second group of bits, decoding a third group of one or more transport channels having a fourth length that is a function of only the first length.

16. The method of claim 14, further comprising:

after decoding both the first group of one or more transport channels and the second group of bits, decoding a third group of one or more transport channels.

17. The method of claim 16, wherein the third group of one or more transport channels has a fourth length that is a function of only the first length.

18. The method of claim 16, wherein the third group of one or more transport channels has a fourth length that is a function of both the first length and the second length.

19. An apparatus for multiplexing data in a frame having a fixed bit length in a telecommunication system, the apparatus comprising:

logic configured to transmit a first transport channel comprising a first number of bits;

logic configured to transmit first error detection bits associated with the first transport channel and comprising a second number of bits;

logic configured to transmit a second transport channel comprising a third number of bits;

logic configured to transmit a third transport channel comprising a fourth number of bits; and logic configured to selectively transmit a control channel comprising a fifth number of bits, wherein:

the control channel is transmitted after the first error detection bits and before transmission of the third transport channel;

whenever the control channel is transmitted as part of the frame, a sum of the first, second, third, fourth and fifth number of bits equals the fixed bit length; and whenever the control channel is not transmitted as part of the frame, a sum of the first, second, third and fourth number of bits equals the fixed bit length.

20. The apparatus of claim 19, wherein the control channel is transmitted between the first error detection bits and the second transport channel.

21. The apparatus of claim 19, wherein the control channel is transmitted between the second and third transport channels.

22. The apparatus of claim 19, wherein the fifth number of bits further includes error detection bits associated with the control channel.

23. An apparatus for decoding multiplexed data that is received as a frame in a telecommunication system, wherein the frame has a fixed bit length, the apparatus comprising:

first decoding logic configured to decode a first transport channel contained in the frame, wherein the first decoding logic includes logic configured to determine a first length of the first transport channel;

second decoding logic configured to decode a second group of bits having a second length that is a function of the first length;

determining logic configured to determine whether the second group of bits includes error detection bits associated with the second group of bits;

logic configured to perform a first operation if the frame includes error detection bits associated with the second group of bits, wherein the first operation comprises determining a third length and starting position of a second transport channel in the frame and decoding the second transport channel, wherein the third length is a function of the first length and the second length; and logic configured to perform a second operation if the frame does not include error detection bits associated with the second group of bits, wherein the second operation comprises using the decoded second group of bits as the decoded second transport channel, wherein the first transport channel and the second group of bits are decoded in a same direction.

24. The apparatus of claim 23, further comprising:

logic configured to perform a third operation after the first transport channel is decoded and before the second group of bits is decoded, wherein the third operation comprises decoding a third transport channel having a fourth length that is a function of only the first length.

25. The apparatus of claim 23, further comprising:

logic configured to perform a third operation after both the first transport channel and the second group of bits are decoded, wherein the third operation comprises decoding a third transport channel.

26. The apparatus of claim 25, wherein the third transport channel has a fourth length that is a function of only the first length.

27. The apparatus of claim 25, wherein the third transport channel has a fourth length that is a function of both the first length and the second length.

28. An apparatus for multiplexing data in a frame having a fixed bit length in a telecommunication system, the apparatus comprising:

logic configured to transmit a first group of one or more transport channels, wherein the one or more transport channels in the first group together comprise a first number of bits;

logic configured to transmit first error detection bits associated with one or more transport channels in the first group of one or more transport channels, wherein the first error detection bits comprise a second number of bits;

logic configured to transmit a second group of one or more transport channels, wherein the one or more transport channels in the second group together comprise a third number of bits;

logic configured to transmit a third group of one or more transport channels, wherein the one or more transport channels in the third group together comprise a fourth number of bits; and logic configured to selectively transmit a control channel comprising a fifth number of bits, wherein:

the control channel is transmitted after the first group of one or more transport channels and the first error detection bits but before transmission of the third group of one or more transport channels;

whenever the control channel is transmitted as part of the frame, a sum of the first, second, third, fourth and fifth number of bits equals the fixed bit length; and whenever the control channel is not transmitted as part of the frame, a sum of the first, second, third and fourth number of bits equals the fixed bit length.

29. The apparatus of claim 28, wherein the control channel is transmitted between the first error detection bits and the second group of one or more transport channels.

30. The apparatus of claim 28, wherein the control channel is transmitted between the second group of one or more transport channels and the third group of one or more transport channels.

31. The apparatus of claim 28, wherein the fifth number of bits further includes error detection bits associated with the control channel.

32. An apparatus for decoding multiplexed data that is received as a frame in a telecommunication system, wherein the frame has a fixed bit length, the apparatus comprising:

first decoding logic configured to decode a first group of one or more transport channels contained in the frame, wherein the first decoding logic includes logic configured to determine a first length of the first group of one or more transport channels;

second decoding logic configured to decode a second group of bits having a second length that is a function of the first length;

determining logic configured to determine whether the second group of bits includes error detection bits associated with the second group of bits;

logic configured to perform a first operation if the frame includes error detection bits associated with the second group of bits, wherein the first operation comprises determining a third length and starting position of a second group of one or more transport channels in the frame and decoding the second group of one or more transport channels, wherein the third length is a function of the first length and the second length; and logic configured to perform a second operation if the frame does not include error detection bits associated with the second group of bits, wherein the second operation comprises using the decoded second group of bits as the decoded second group of one or more transport channels, wherein the first group of one or more transport channels and the second group of bits are decoded in a same direction.

33. The apparatus of claim 32, further comprising:

logic configured to perform a third operation after the first group of one or more transport channels is decoded and before the second group of bits is decoded, wherein the third operation comprises decoding a third group of one or more transport channels having a fourth length that is a function of only the first length.

34. The apparatus of claim 32, further comprising:

logic configured to perform a third operation after both the first group of one or more transport channels and the second group of bits are decoded, wherein the third operation comprises decoding a third group of one or more transport channels.

35. The apparatus of claim 34, wherein the third group of one or more transport channels has a fourth length that is a function of only the first length.

36. The apparatus of claim 34, wherein the third group of one or more transport channels has a fourth length that is a function of both the first length and the second length.

* * * * *